(12) United States Patent
Dueck

(10) Patent No.: US 9,017,001 B1
(45) Date of Patent: Apr. 28, 2015

(54) INTEGRATED ELEVATOR BIN SYSTEM

(71) Applicant: V-Bins.com GP Inc., Morris (CA)

(72) Inventor: Raymond Dueck, East St. Paul (CA)

(73) Assignee: V-Bins.com GP Inc., Morris (CA)

( * ) Notice: Subject to any disclaimer, the term of this patent is extended or adjusted under 35 U.S.C. 154(b) by 126 days.

(21) Appl. No.: 13/799,529

(22) Filed: Mar. 13, 2013

(51) Int. Cl.
*B65G 65/00* (2006.01)
*B65G 65/32* (2006.01)

(52) U.S. Cl.
CPC ..................................... *B65G 65/32* (2013.01)

(58) Field of Classification Search
USPC ......... 414/293, 299, 300, 301, 298, 326, 328;
198/716, 725, 511, 516, 519, 580, 657,
198/658, 801, 836.1
See application file for complete search history.

(56) References Cited

U.S. PATENT DOCUMENTS

| | | | | |
|---|---|---|---|---|
| 196,348 | A * | 10/1877 | Gallaher | 198/568 |
| 222,137 | A * | 12/1879 | Imhorst | 198/701 |
| 675,815 | A * | 6/1901 | Clarke | 198/527 |
| 688,684 | A * | 12/1901 | Piez | 198/523 |
| 939,830 | A * | 11/1909 | Haenke | 193/29 |
| 1,861,976 | A * | 6/1932 | Pardee | 193/12 |
| 2,084,920 | A * | 6/1937 | Schrag et al. | 198/569 |
| 3,358,856 | A * | 12/1967 | Weibull | 414/298 |
| 3,602,363 | A | 8/1971 | Smith | |
| 3,687,272 | A * | 8/1972 | Eisenegger | 198/716 |
| 3,792,790 | A | 2/1974 | Brubaker | |
| 4,138,021 | A * | 2/1979 | McKenzie | 414/298 |
| 4,159,053 | A | 6/1979 | Taylor | |
| 4,333,561 | A * | 6/1982 | Schlegel | 198/703 |
| 4,487,542 | A * | 12/1984 | Johanning et al. | 414/292 |
| 4,534,461 | A | 8/1985 | Silverthorn | |
| 4,564,317 | A * | 1/1986 | Farber | 406/56 |
| 4,603,769 | A * | 8/1986 | Bach et al. | 193/12 |
| 5,873,447 | A | 2/1999 | Plett | |
| 7,556,465 | B2 * | 7/2009 | Moen | 414/293 |
| 8,734,081 | B2 * | 5/2014 | Stegemoeller et al. | 414/293 |
| 2005/0036860 | A1 * | 2/2005 | Moen | 414/288 |
| 2010/0093413 | A1 * | 4/2010 | Pope et al. | 460/68 |
| 2011/0123303 | A1 * | 5/2011 | Stegemoeller et al. | 414/293 |
| 2013/0149081 | A1 * | 6/2013 | Noyes | 414/298 |

* cited by examiner

*Primary Examiner* — Kaitlin Joerger
(74) *Attorney, Agent, or Firm* — Neustel Law Offices

(57) ABSTRACT

An integrated elevator bin system for efficiently loading and distributing a particulate material within a storage bin. The integrated elevator bin system generally includes a storage bin having an elevator assembly positioned therein for aiding with the even distribution of particulate material being loaded into the bin. The elevator assembly, which vertically extends from a lower portion of the storage bin, includes an internal conveyor having a track and plurality of paddles for transferring the material up the elevator assembly. The upper and lower sections of the elevator assembly include louvered openings for selectively distributing the particulate material into the interior of the bin as the material is conveyed up the elevator assembly.

20 Claims, 7 Drawing Sheets

INTEGRATED ELEVATOR BIN SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to grain bins and more specifically it relates to an integrated elevator bin system for efficiently loading and distributing a particulate material within a storage bin.

2. Description of the Related Art

Any discussion of the related art throughout the specification should in no way be considered as an admission that such related art is widely known or forms part of common general knowledge in the field.

Storage bins have been in use for many decades in the storage of particulate material such as grains. These storage bins are often needed to store large volumes of material and thus generally exhibit a large construction. Given the large size of storage bins commonly in use today, it is typically difficult to efficiently fill the tanks without aid from separate machinery.

In the past, large augers have been utilized to evenly distribute a particulate material such as grain throughout a large storage bin. However, these large augers are often inefficient to use and costly to maintain. Further, given the significant height of many storage bins, large augers are often in danger of coming into contact with an overhead power line which can increase the risk of electrocution.

Because of the inherent problems with the related art, there is a need for a new and improved integrated elevator bin system for efficiently loading and distributing a particulate material within a storage bin.

BRIEF SUMMARY OF THE INVENTION

The invention generally relates to a particulate material bin which includes a storage bin having an elevator assembly positioned therein for aiding with the even distribution of particulate material being loaded into the bin. The elevator assembly, which vertically extends from a lower portion of the storage bin, includes an internal conveyor having a track and plurality of paddles for transferring the material up the elevator assembly. The upper and lower sections of the elevator assembly include louvered openings for selectively distributing the particulate material into the interior of the bin as the material is conveyed up the elevator assembly.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
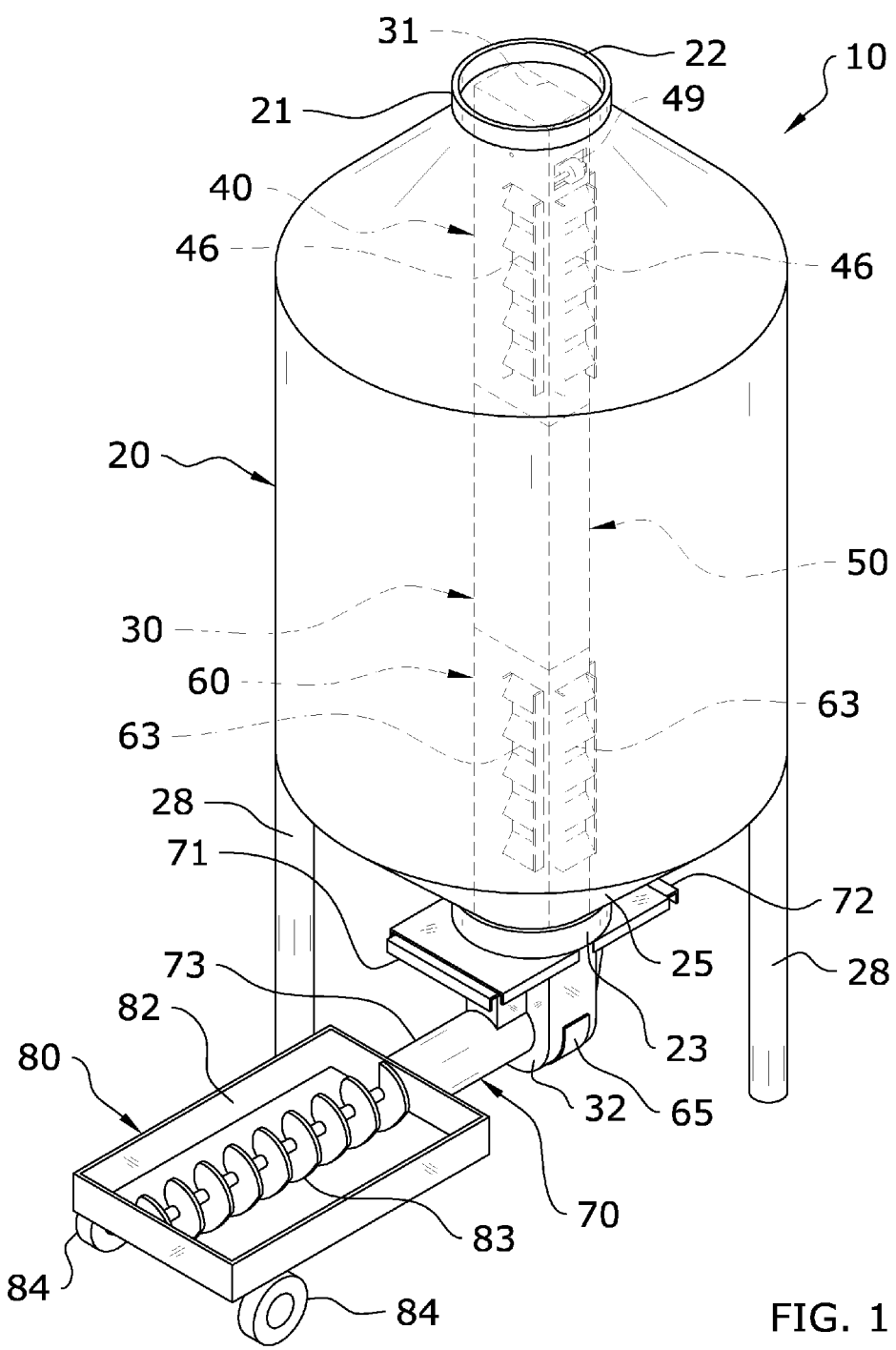
FIG. 1 is an upper perspective view of the present invention with the loading attachment secured thereto.
Figure 2:
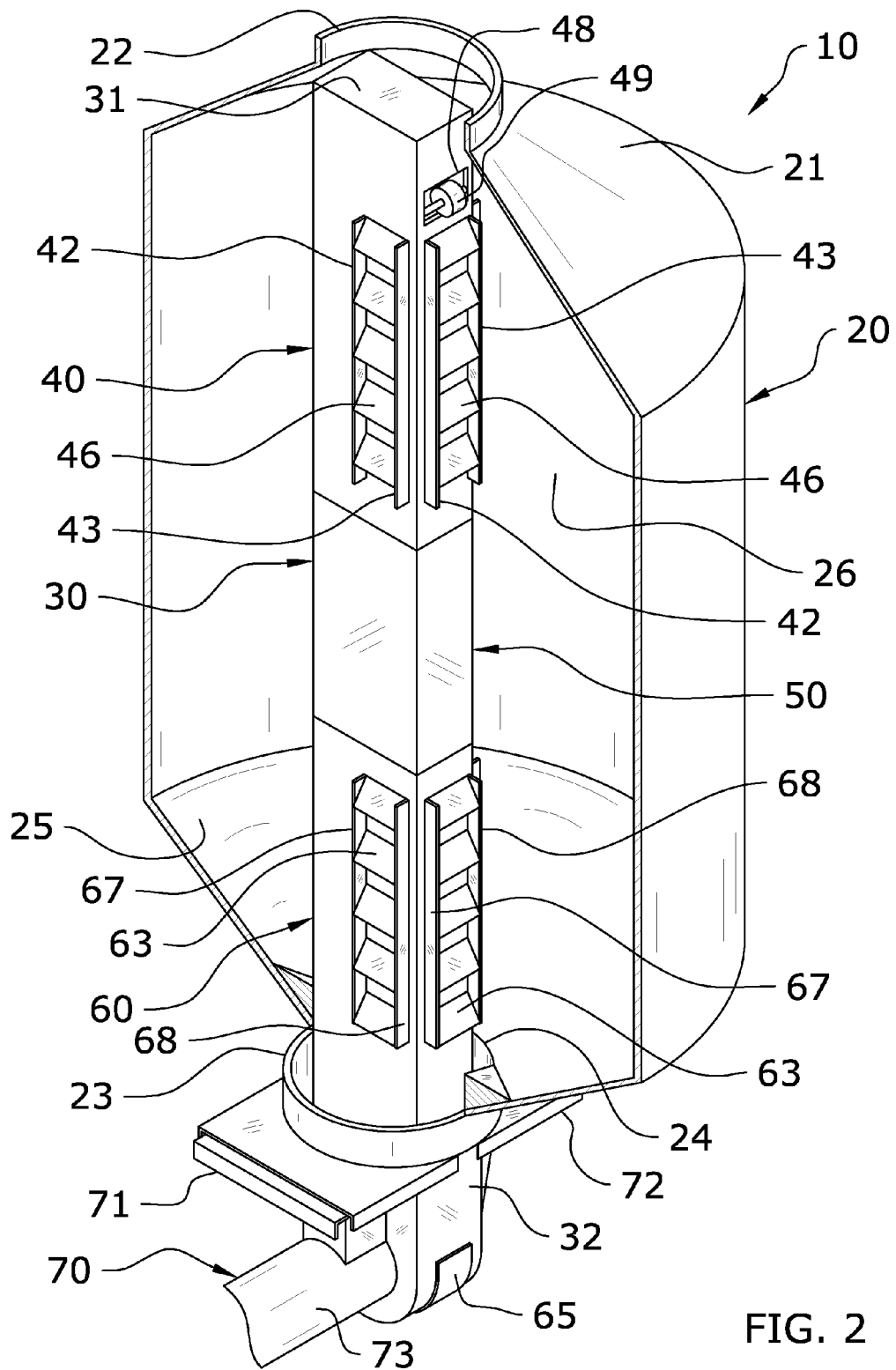
FIG. 2 is a sectional view of the bin of the present invention.
Figure 3:
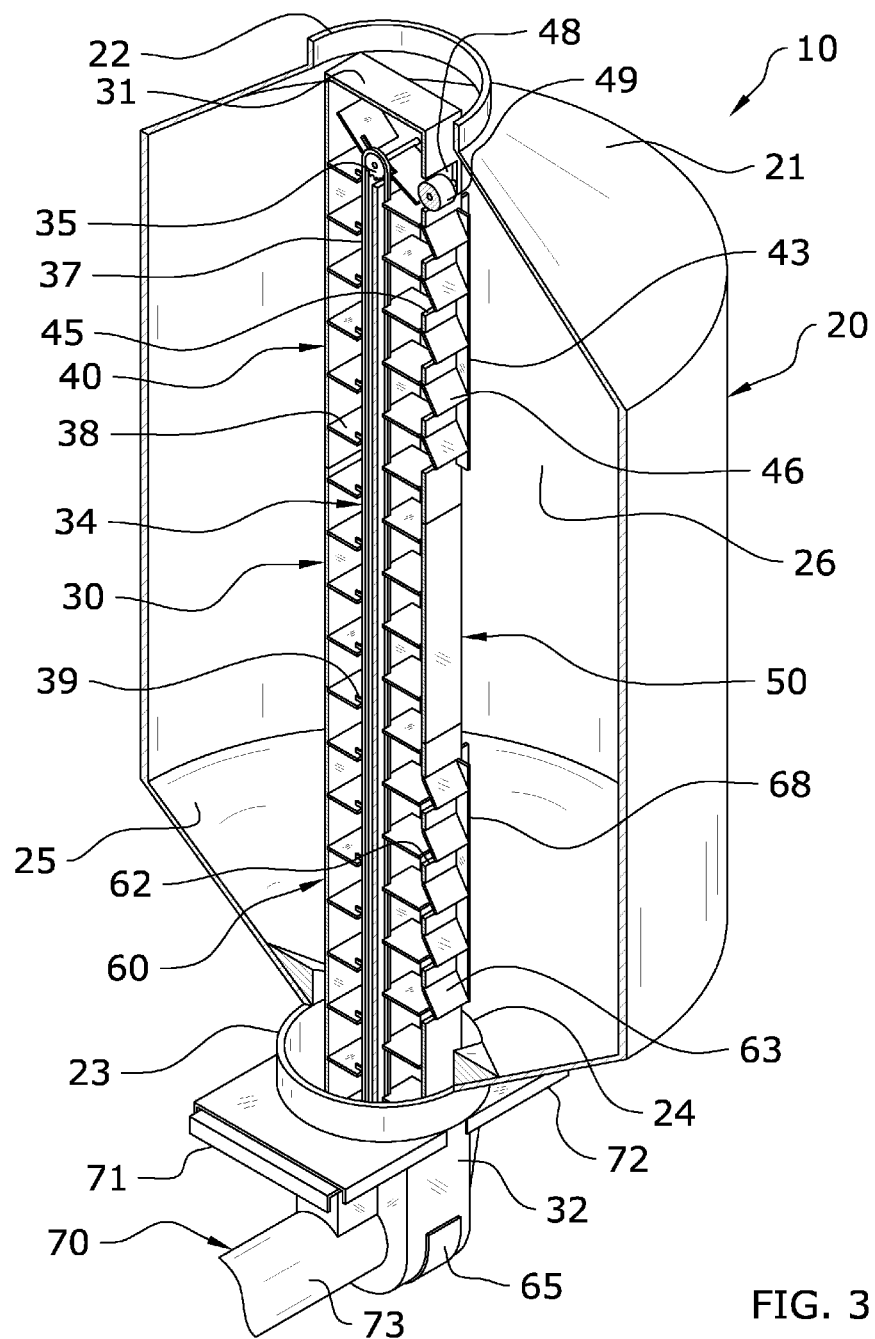
FIG. 3 is a sectional view of the bin and elevator assembly of the present invention.

A. Overview.

Turning now descriptively to the drawings, in which similar reference characters denote similar elements throughout the several views, FIGS. 1 through 7 illustrate an integrated elevator bin system 10, which comprises a storage bin 20 having an elevator assembly 30 positioned therein for aiding with the even distribution of particulate material 12 being loaded into the bin 20. The elevator assembly 30, which vertically extends from a lower portion of the storage bin 20, includes an internal conveyor 34 having a track 37 and plurality of paddles 38 for transferring the material 12 up the elevator assembly 30. The upper and lower sections 40, 60 of the elevator assembly 30 include louvered openings 45, 62 for selectively distributing the particulate material 12 into the interior 26 of the bin 20 as the material 12 is conveyed up the elevator assembly 30.

B. Storage Bin.

The present invention is adapted for use in combination with a storage bin 20 for storing particulate material 12 such as grain and the like. The figures illustrate an exemplary storage bin 20 for use with the present invention. It is appreciated that the storage bin 20 shown in the figures and described below is merely for exemplary purposes. Various types of storage bins 20 may be used in combination with the present invention. Thus, the scope of the present invention should not be construed as being limited to the particular construction of storage bin 20 shown and described herein for exemplary purposes.

A typical storage bin 20 for use with the present invention includes an upper end 21 which includes an upper opening 23 providing access to its interior 26. The lower end 23 of the storage bin 20 generally includes a lower hopper 25 having a lower opening 24 through which particulate material 12 may be inserted or removed from the bin 20 in combination with the present invention as described and shown herein. The storage bin 20 will generally be a free-standing structure, and thus may include legs 28 as shown in FIG. 1.

C. Elevator Assembly.

The present invention utilizes an elevator assembly 30 to facilitate efficient loading and unloading of particulate material 12 into and out of the interior 26 of the storage bin 20. The elevator assembly 30 is generally comprised of three sections: an upper section 40 which is positioned adjacent the upper opening 22 of the bin 20, a lower section 60 which is positioned adjacent to and extending through the lower opening 24 of the bin 20 and one or more extension sections 50 which may be positioned between the upper and lower sections 40, 60 to properly size the elevator assembly 30 for the particular storage bin 20 it is being installed on.

It is appreciated that the sections 40, 50, 60 of the elevator assembly 30 may be integrally formed of a unitary structure to form a single, continuous elevator assembly 30. In other embodiments, the sections 40, 50, 60 may be comprised of discrete structures which are fixedly or removably attached to each other to form the elevator assembly 30. Thus use of discrete structures allows for a variable number of extension sections 50 to be utilized so that the present invention may be adapted for use with a wide variety of differently-sized storage bins 20.

The elevator assembly 30 will generally include a tubular structure and include at least one sidewall as shown in the figures. The tubular structure of the elevator assembly 30 accommodate transfer of particulate matter 12 through the elevator assembly 30 using the conveyor 34. In a preferred embodiment, the elevator assembly 30 will be comprised of a rectangular cross-sectional shape. Such a shape will accommodate rectangular paddles 38, though it is appreciated that, in some embodiments, the sidewalls of the elevator assembly 30 could be curved to accommodate curved-end paddles 38.

Figure 5:
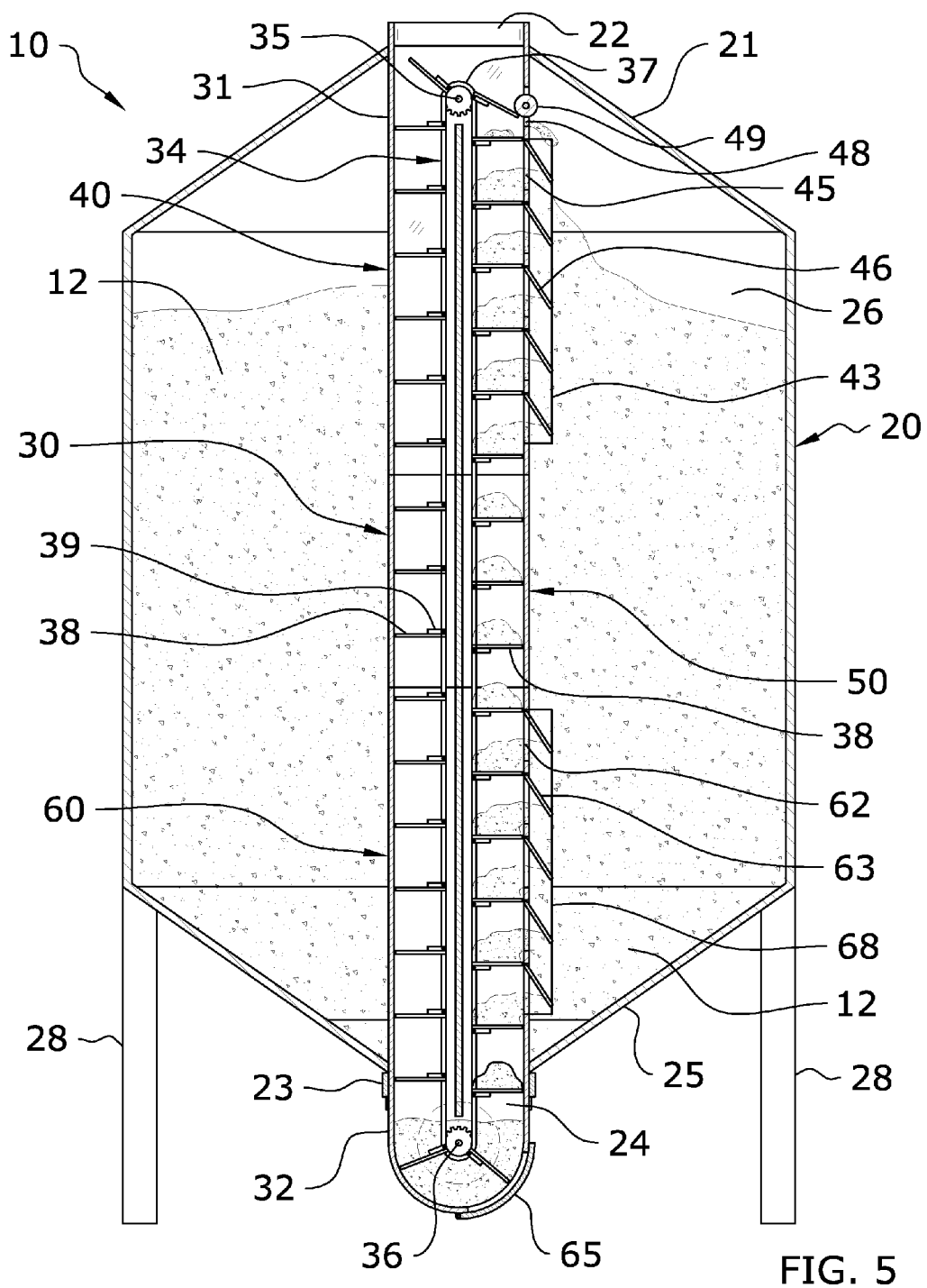
FIG. 5 is a sectional view of the present invention illustrating particulate material filling the bin.

The elevator assembly 30 includes an upper end 31 and a lower end 32. The upper end 31 of the elevator assembly 30, comprised of the upper end of the upper section 40, is generally positioned adjacent to the upper opening 22 as shown in FIG. 1. The lower end 32 of the elevator assembly 30, comprised of the lower end of the lower section 60, is generally positioned at a lower portion of the elevator assembly 30, such as adjacent to the lower opening 24 as shown in FIG. 5.

The elevator assembly 30 includes an internal conveyor 34 for transferring particulate material 12 vertically upward. The elevator assembly 30 includes an outer housing comprised of the various sections 40, 50, 60 of the assembly 30 which is positioned around the conveyor 34 as shown in FIG. 5.

The conveyor 34 is generally comprised of an upper sprocket 35 positioned adjacent the upper end 31 of the elevator assembly 30, a lower sprocket 36 positioned adjacent the lower end 32 of the elevator assembly 30 and a track 37 linked between the upper and lower sprockets 35, 36.

The track 37, which is generally comprised of an elongated member positioned in a loop configuration, is continuously driven in a closed path by a power source such as a motor, hydraulics and the like. The track 37 includes a first run which moves upwardly to upwardly convey the particulate material 12 and a second run that moves downwardly. The first run is preferably vertically oriented.

Figure 4:
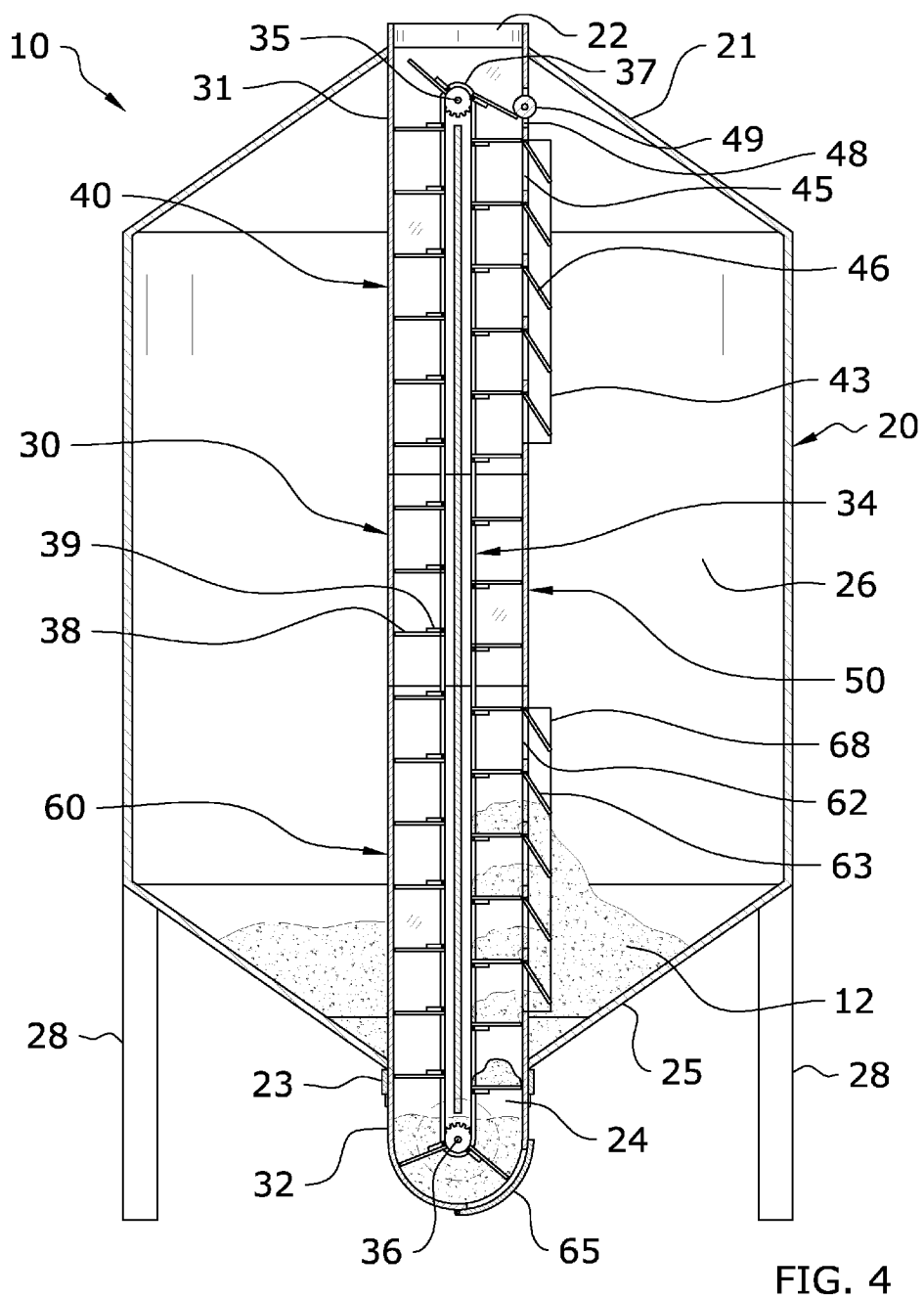
FIG. 4 is a sectional view of the present invention illustrating particulate material being loaded into the bin.

A plurality of paddles 38 extend outwardly in a substantially horizontal direction from the track 37. The paddles 38 hold the particulate material 12 as it is being lifted through the elevator assembly 30 as shown in FIG. 4. Support members 39 may be utilized to secure each paddle 38 to the track 37 as shown in FIG. 5.

i. Upper Section.

The elevator assembly 30 of the present invention generally includes an upper section 40 as shown in FIG. 1. The upper section 40 of the elevator assembly 30 is comprised of the upper portion of the elevator assembly 30 adjacent the upper opening 22 of the storage bin 20. The upper section 40 surrounds and encloses the upper portion of the conveyor 34, including the upper sprocket 35.

The upper section 40 of the elevator assembly 30 includes a plurality of louver openings 45 extending vertically along at least one side thereof as shown in the figures. Each of the louver openings 45 includes a pivotally secured louver 46 for selectively covering the corresponding louver opening 45.

Each louver 46 generally extends outwardly from at least one sidewall of the elevator assembly 30, being adapted to prevent particulate material 12 outside of the elevator assembly from entering via the openings 45. The louvers 46 each will generally be angled downwardly and outwardly from a sidewall of the elevator assembly 30. Preferably, each of the louvers 46 will have a width approximately equal to or greater than the width of the corresponding opening 45 to ensure that particulate material 12 does not escape.

As shown in the figures, the louver openings 45 generally extend in vertical rows down the side of the upper section 40. It is appreciated that one or more sides of the upper section 40 may include such a row of louvered openings 45. In a preferred embodiment as shown in the figures, three sides of the upper section 40 will include such louvered openings 45 extending in vertical alignment thereon. Thus, it is appreciated that, depending on the embodiment, there could be one, two, three or more vertical rows of louver openings 45 extending through the upper section 40.

Each opening 45 will generally include a first side panel 42 extending outwardly from the elevator assembly 30 adjacent a first side of the opening 45 and a second side panel 43 extending outwardly from the elevator assembly 30 adjacent a second side of the opening 45. In some embodiments as shown in the figures, each opening 45 has its own discrete set of side panels 42, 43. In other embodiments, a single set of side panels 42, 43 could extend completely along the entire vertical length of the entire row of openings 45. The side panels 42, 43 prevent escape of particulate material 12 and act as a guide for the louvers 46 as they pivot open and shut.

Figure 6:
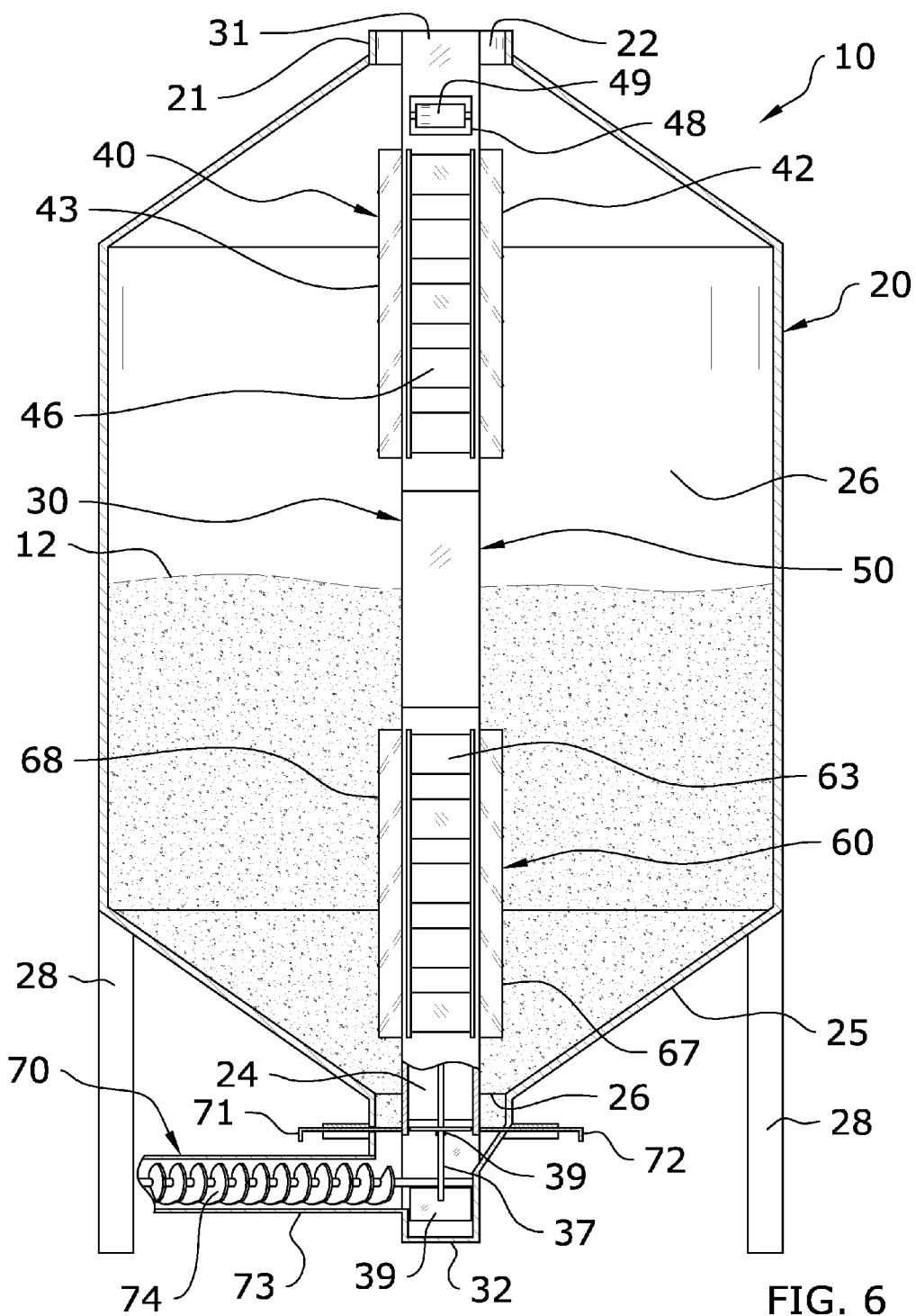
FIG. 6 is a sectional view of the present invention illustrating the storage bin holding particulate material therein with the gates closed.
Figure 7:
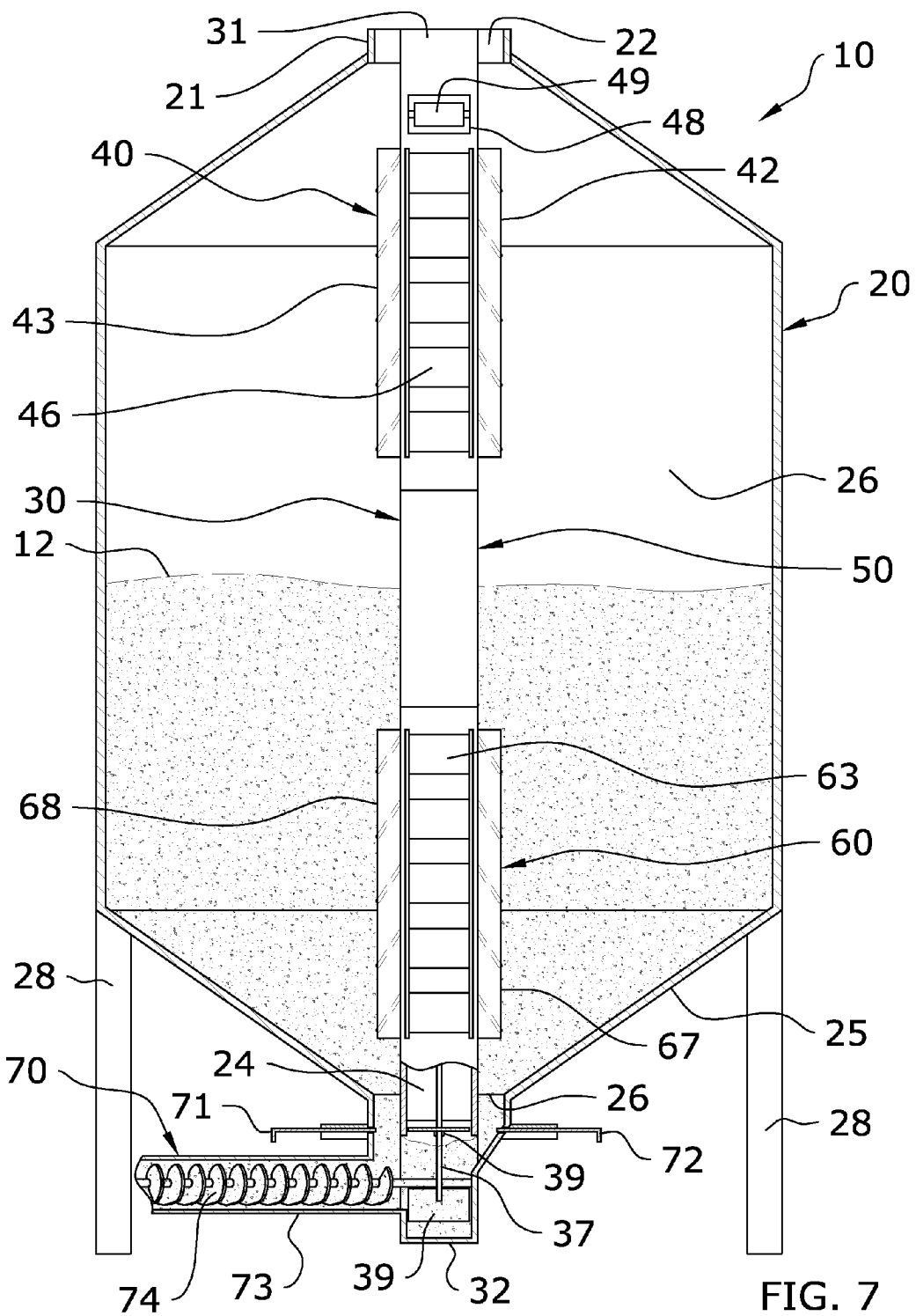
FIG. 7 is a sectional view of the present invention illustrating unloading of the storage bin through the transfer assembly with the gates open.

The upper section 40 of the elevator assembly 30 also includes a vibration member 49 which aids with jostling free particular material 12 from the louvers 46 in the upper section 40. Various devices may be included to impart such vibrational movement. In a preferred embodiment as shown in FIG. 6, a mounting opening 48 is formed on one side of the upper section 40 above the louvered openings 45. A vibration wheel 49 is positioned within the mounting opening 48 which is adapted to engage a distal end of each paddle 38 on the first run to deflect the paddle 38 to cause any remaining particulate material 12 to fall from the paddle 38.

ii. Extension Section.

The extension section 50 links the upper section 40 of the elevator assembly 30 with the lower section 60 of the elevator assembly 30. The extension section 50 is comprised of a chute-like surrounding which encloses the central sections of the conveyor 34. The extension section 50 generally does not include any openings 45, 62 or louvers 46, 63.

While the figures illustrate usage of only a single extension section 50, it is appreciated that more extension sections 50 may be utilized to adapt the present invention for use with various storage bins 20. Preferably, each extension section 50 will be comprised of a five-foot length of chute such that multiple extension sections 50 may be stacked to accommodate larger storage bins 20.

The different extension sections 50 may be secured to each other and to the upper and lower sections 40, 60 through various means known in the art, such as welding, bolts or use of other coupling methods and devices. It is appreciated that, in some embodiments, the extension section(s) 50, upper section 40 and lower section 60 may be integrally formed of a unitary structure.

iii. Lower Section.

The elevator assembly 30 includes a lower section 60 as shown in the figures. The lower section 60 of the elevator assembly 30 extends downwardly from the extension section 50. The lower section 60 of the elevator assembly 30 is comprised of the lower portion of the elevator assembly 30 which extends through the lower opening 24 of the storage bin 20. The lower section 60 surrounds and encloses the lower portion of the conveyor 34, including the lower sprocket 36.

The lower section 60 of the elevator assembly 30 includes a plurality of louver openings 62 extending vertically along at least one side thereof as shown in the figures. Each of the louver openings 62 includes a pivotally secured louver 63 for selectively covering the corresponding louver opening 62.

Each louver 63 generally extends outwardly from at least one sidewall of the elevator assembly 30, being adapted to prevent particulate material 12 outside of the elevator assembly from entering via the openings 62. The louvers 63 each will generally be angled downwardly and outwardly from a sidewall of the elevator assembly 30. Preferably, each of the louvers 63 will have a width approximately equal to or greater than the width of the corresponding opening 62 to ensure that particulate material 12 does not escape.

As shown in the figures, the louver openings 62 generally extend in vertical rows up the side of the lower section 60. It is appreciated that one or more sides of the lower section 60 may include such a row of louvered openings 65. In a preferred embodiment as shown in the figures, two sides of the lower section 60 will include such louvered openings 62 extending in vertical alignment thereon. Thus, it is appreciated that, depending on the embodiment, there could be one, two, three or more vertical rows of louver openings 62 extending through the lower section 60.

Each opening 62 will generally include a first side panel 67 extending outwardly from the elevator assembly 30 adjacent a first side of the opening 62 and a second side panel 68 extending outwardly from the elevator assembly 30 adjacent a second side of the opening 62. In some embodiments as shown in the figures, each opening 62 has its own discrete set of side panels 67, 68. In other embodiments, a single set of side panels 67, 68 could extend completely along the entire vertical length of the entire row of openings 62. The side panels 67, 68 prevent escape of particulate material 12 and act as a guide for the louvers 63 as they pivot open and shut.

As best shown in FIG. 5, the lower section 60 may also include a cleanout cover 65 which removably covers an opening. The cleanout cover 62 may be removed to clean debris out of the elevator assembly 30 if so needed.

D. Transfer Assembly.

The present invention includes a transfer assembly 70 extending out of the lower opening 24 of the storage bin 20. The transfer assembly 70 is utilized to aid in transferring particulate material 12 into and out of the elevator assembly 30 and storage bin 20.

The transfer assembly 70 extends from the portion of the lower section 60 which extends out of the lower opening 24 of the storage bin 20. The transfer assembly 70 generally includes a pair of gates 71, 72 which may be utilized to selectively allow or prevent passage of particulate material 12 out of the lower section 60 and into the transfer assembly 70.

The transfer assembly 70 also preferably includes a transfer conduit 73 comprised of a pipe or tubing which extends horizontally from the lower section 60 below the gates 71, 72. A transfer auger 74 may be included within the transfer conduit 73 to ease passage of particulate material 12 therethrough.

E. Loading Attachment.

As shown in FIG. 1, the present invention may utilize a loading attachment 80 to aid in loading the storage bin 20 using the elevator assembly 30. The loading attachment 80 may be comprised of a tray-shaped receiver member 82 which is secured to the transfer assembly 70. A loading auger extends across the receiver member 82 which will guide any particulate material 12 placed within the receiver unit 82 into the transfer assembly 70 of the present invention. The loading attachment 80 may also include wheels 84 to ease with placing the loading attachment 80 into and out of position for loading the storage bin 20.

F. Operation of Preferred Embodiment.

In use, particulate material 12 is fed into the transfer assembly 70, such as through usage of a loading attachment 80 as described above. However, it is appreciated that various other devices and methods may be utilized to load particulate material 12 into the transfer assembly 70.

The conveyor 34 is activated to begin movement of the paddles 38 along the track 37. The conveyor 34 may be powered by various means, such as an electric motor. With the paddles 38 moving along the track 37, particulate material 12 will be picked up by each paddle 38 as the material 12 enters the transfer assembly 70 as shown in FIG. 4.

As the paddles 38 move along the track 37, particulate material 12 will be distributed evenly within the storage bin 20 due to the material 12 being pushed into the bin 20 through the louvered openings 45, 62 in the upper and lower sections 40, 60 of the elevator assembly 20. The vibration member 49 will ensure that any particulate material 12 remaining on the paddles 38 in the upper section 40 will be expelled through the louver openings 45 thereof. Any remaining particulate material 12 within the elevator assembly 30 may be removed through use of the cleanout cover 65.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An integrated elevator bin system, comprising:
   a storage bin for storing a particulate material, wherein said storage bin includes a lower opening;
   an elevator assembly positioned within said storage bin, wherein said elevator assembly is vertically orientated extending from a lower portion of said storage bin, wherein said elevator assembly is comprised of a tubular structure having at least one sidewall;
a plurality of openings extending into said at least one sidewall;
a plurality of louvers extending outwardly from said at least one sidewall and positioned above said plurality of openings, wherein said plurality of louvers are adapted to prevent substantially all particulate material outside of said elevator assembly from entering via said plurality of openings; and
a conveyor positioned within said elevator assembly, wherein said conveyor is adapted to convey particulate material upwardly within said elevator assembly, wherein said plurality of openings are adapted so that upwardly conveyed particulate material is dispersed outwardly through said plurality of openings from said elevator assembly.

2. The integrated elevator bin system of claim 1, wherein said plurality of openings extend from a lower end to an upper end of said elevator assembly.

3. The integrated elevator bin system of claim 1, wherein said plurality of openings extend within a lower section and an upper section of said elevator assembly.

4. The integrated elevator bin system of claim 1, wherein said elevator assembly has a rectangular cross sectional shape.

5. The integrated elevator bin system of claim 1, wherein said plurality of openings are distally spaced in a vertical manner along said elevator assembly.

6. The integrated elevator bin system of claim 1, wherein said plurality of openings each have a longitudinal axis that extends horizontally.

7. The integrated elevator bin system of claim 1, wherein plurality of louvers have a width approximately equal to or greater than a width of said plurality of openings.

8. The integrated elevator bin system of claim 1, wherein said plurality of louvers are angled downwardly and outwardly from said at least one sidewall.

9. The integrated elevator bin system of claim 1, wherein said at least one sidewall is comprised of four sidewalls.

10. The integrated elevator bin system of claim 9, wherein said plurality of openings extend into at least two of said four sidewalls.

11. The integrated elevator bin system of claim 9, wherein said plurality of openings extend into at least three of said four sidewalls.

12. The integrated elevator bin system of claim 1, including a first side panel and a second side panel positioned on opposite sides of said plurality of louvers, wherein said first side panel and said second side panel extend outwardly from said at least one sidewall adjacent to opposite sides of said plurality of louvers.

13. The integrated elevator bin system of claim 1, wherein said conveyor includes a plurality of paddles secured to a movable track, wherein said movable track has a first run that moves upwardly to upwardly convey the particulate material and a second run that moves downwardly.

14. The integrated elevator bin system of claim 13, wherein said first run is vertically orientated and said plurality of paddles on said first run extend outwardly substantially horizontal.

15. The integrated elevator bin system of claim 14, including a vibration member attached to an upper portion of said elevator assembly, wherein said vibration member is adapted to engage a distal end of an upper paddle of said plurality of paddles on said first run to deflect said upper paddle to cause any remaining particulate material to fall from said upper paddle.

16. An integrated elevator bin system, comprising:
a storage bin for storing a particulate material, wherein said storage bin includes a lower opening;
an elevator assembly positioned within said storage bin, wherein said elevator assembly is vertically orientated extending from a lower portion of said storage bin, wherein said elevator assembly is comprised of a tubular structure having at least one sidewall;
a plurality of openings comprised of a first vertical row of openings extending into said at least one sidewall and a second vertical column of openings extending into said at least one sidewall, wherein said second vertical column of openings is horizontally spaced from said first vertical column;
a plurality of louvers extending outwardly from said at least one sidewall and positioned above said plurality of openings, wherein said plurality of louvers are adapted to prevent substantially all particulate material outside of said elevator assembly from entering via said plurality of openings; and
a conveyor positioned within said elevator assembly, wherein said conveyor is adapted to convey particulate material upwardly within said elevator assembly, wherein said plurality of openings are adapted so that upwardly conveyed particulate material is dispersed outwardly through said plurality of openings from said elevator assembly.

17. The integrated elevator bin system of claim 16, wherein said plurality of openings extend from a lower end to an upper end of said elevator assembly.

18. The integrated elevator bin system of claim 16, wherein plurality of louvers have a width approximately equal to or greater than a width of said plurality of openings.

19. The integrated elevator bin system of claim 16, wherein said plurality of louvers are angled downwardly and outwardly from said at least one sidewall.

20. An integrated elevator bin system, comprising:
a storage bin for storing a particulate material, wherein said storage bin includes a lower opening;
an elevator assembly positioned within said storage bin, wherein said elevator assembly is vertically orientated extending from a lower portion of said storage bin, wherein said elevator assembly is comprised of a tubular structure having at least one sidewall;
wherein said elevator assembly has a rectangular cross sectional shape;
a plurality of openings extending into said at least one sidewall, wherein said plurality of openings are distally spaced in a vertical manner along said elevator assembly;
a plurality of louvers extending outwardly from said at least one sidewall and positioned above said plurality of openings, wherein said plurality of louvers are adapted to prevent substantially all particulate material outside of said elevator assembly from entering via said plurality of openings;
wherein plurality of louvers have a width approximately equal to or greater than a width of said plurality of openings;
wherein said plurality of louvers are angled downwardly and outwardly from said at least one sidewall; and
a conveyor positioned within said elevator assembly, wherein said conveyor is adapted to convey particulate material upwardly within said elevator assembly, wherein said plurality of openings are adapted so that upwardly conveyed particulate material is dispersed outwardly through said plurality of openings from said elevator assembly;

wherein said conveyor includes a plurality of paddles secured to a movable track, wherein said movable track has a first run that moves upwardly to upwardly convey the particulate material and a second run that moves downwardly, wherein said first run is vertically orientated and said plurality of paddles on said first run extend outwardly substantially horizontal.

* * * * *